A. S. HUBBARD.
ELECTRICAL SYSTEM OF DISTRIBUTION.
APPLICATION FILED JUNE 8, 1906.
972,536.
Patented Oct. 11, 1910.
4 SHEETS—SHEET 1.
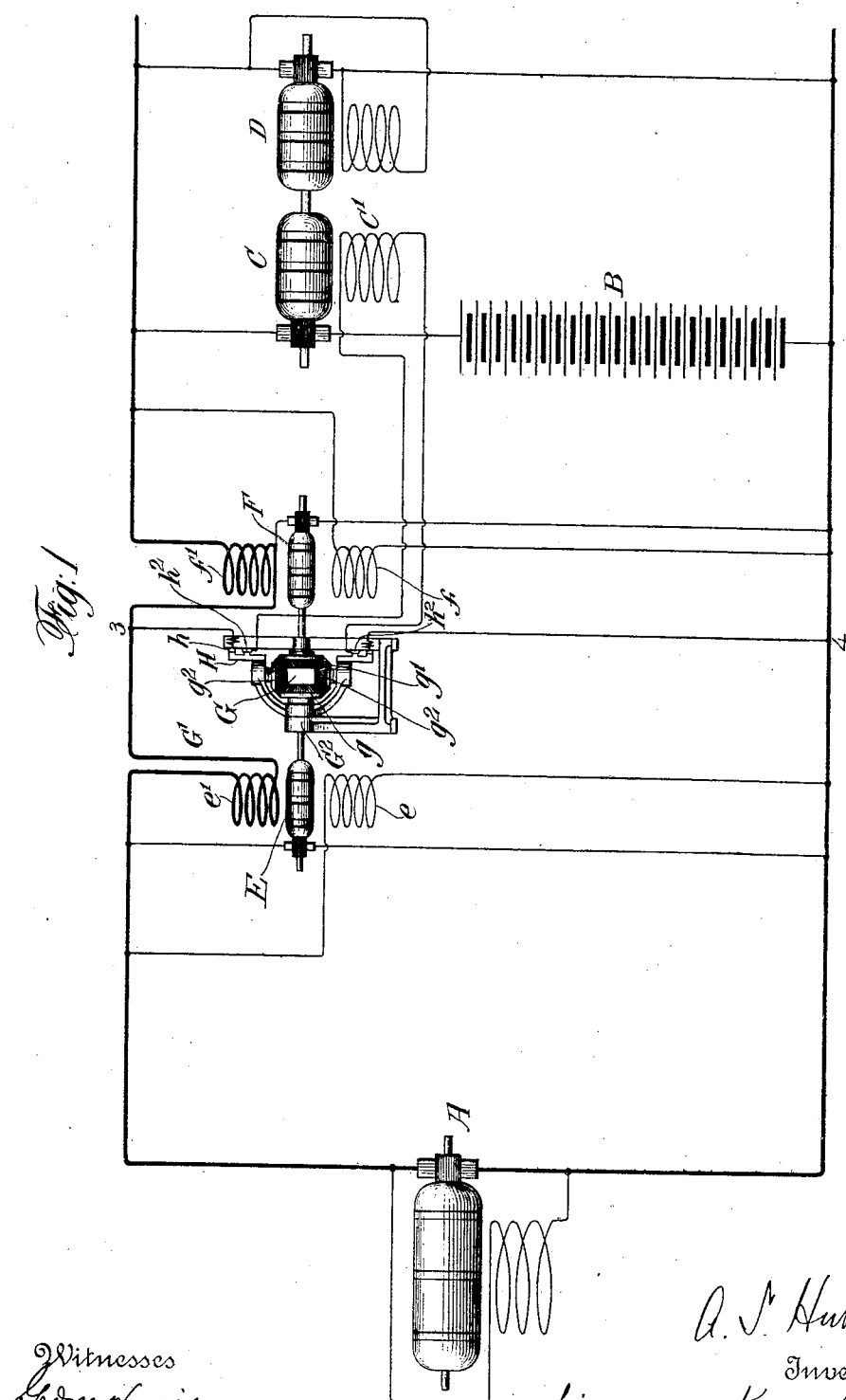

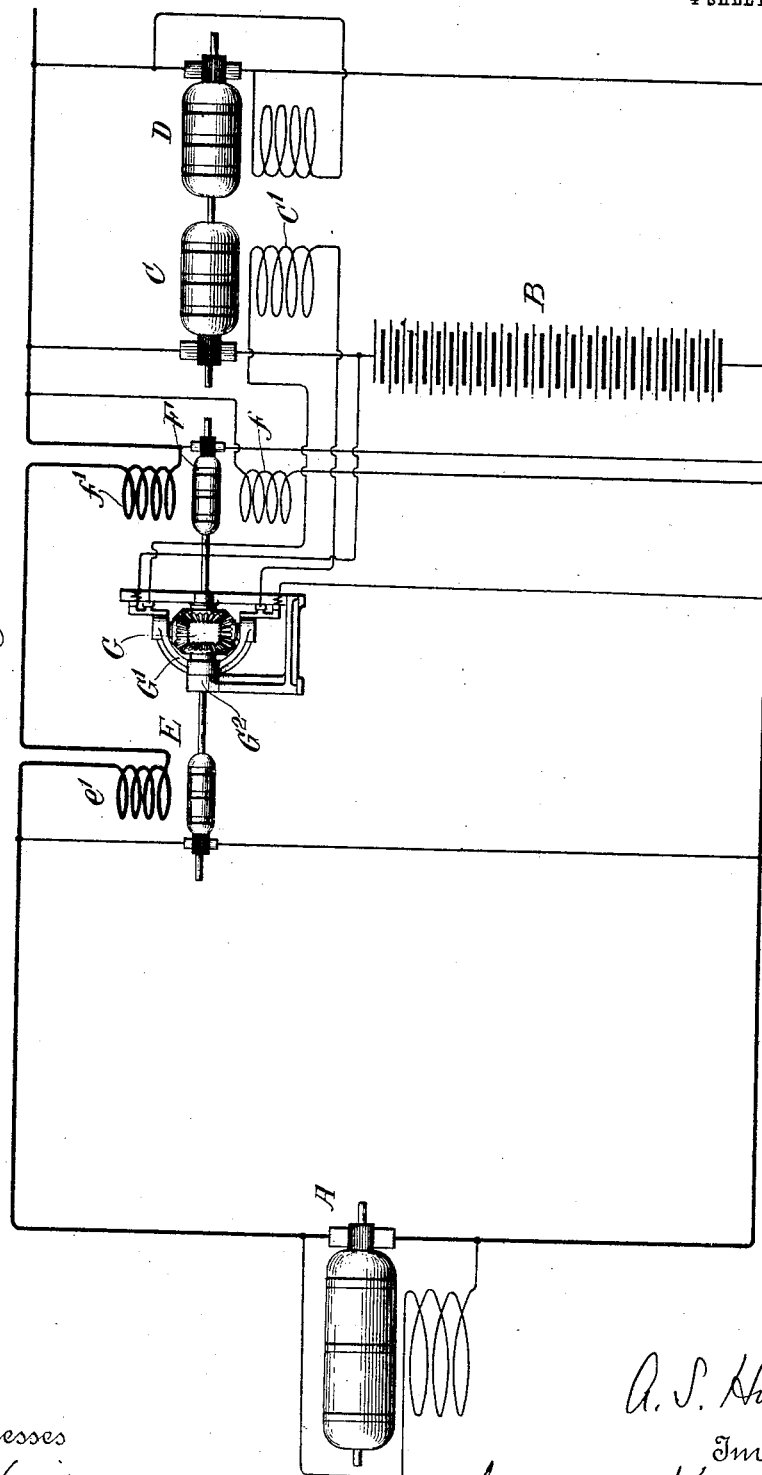

A. S. HUBBARD.
ELECTRICAL SYSTEM OF DISTRIBUTION.
APPLICATION FILED JUNE 8, 1906.
972,536.
Patented Oct. 11, 1910.
4 SHEETS—SHEET 3.
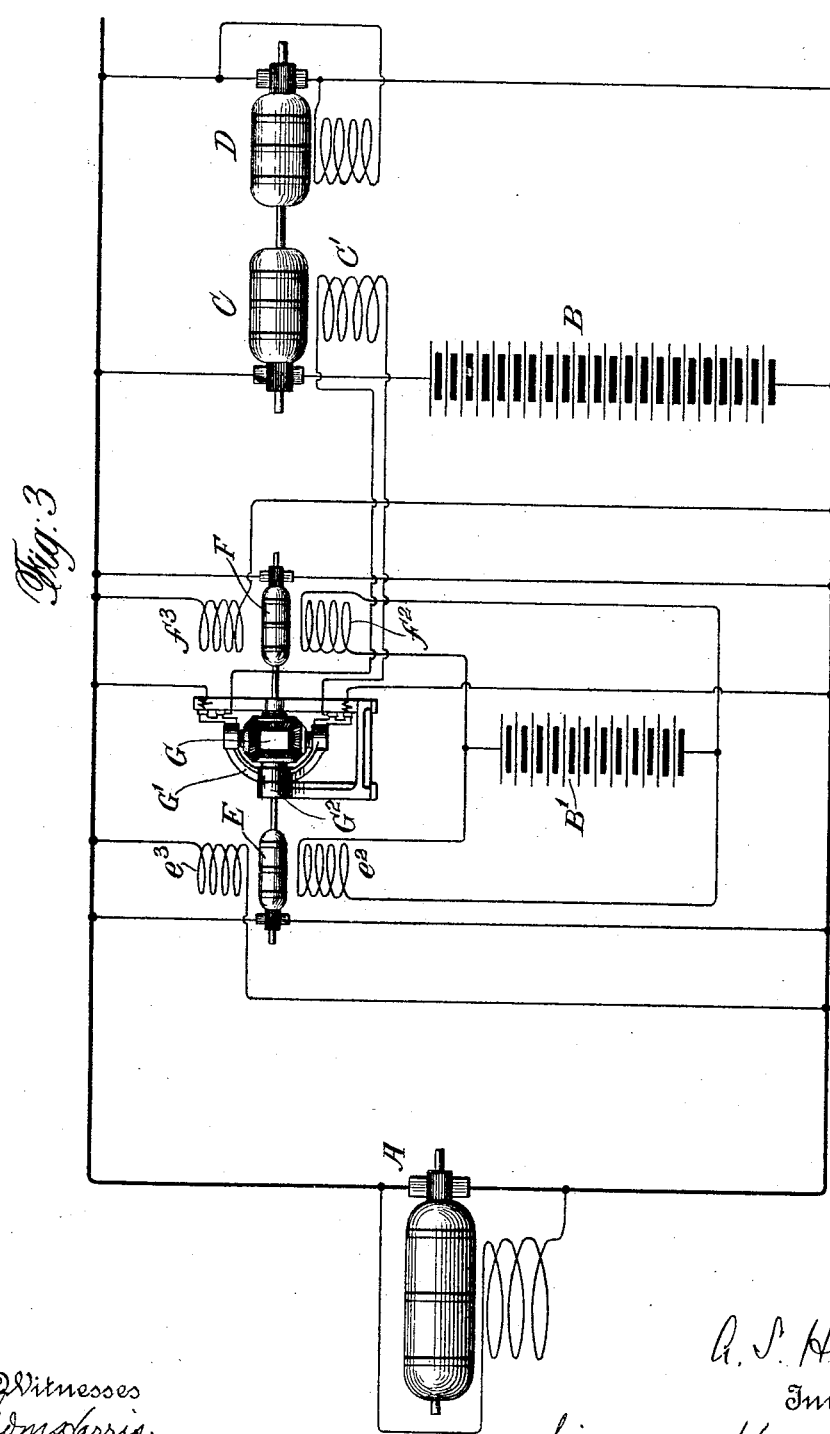

A. S. HUBBARD.
ELECTRICAL SYSTEM OF DISTRIBUTION.
APPLICATION FILED JUNE 8, 1906.
972,536.
Patented Oct. 11, 1910.
4 SHEETS—SHEET 4.
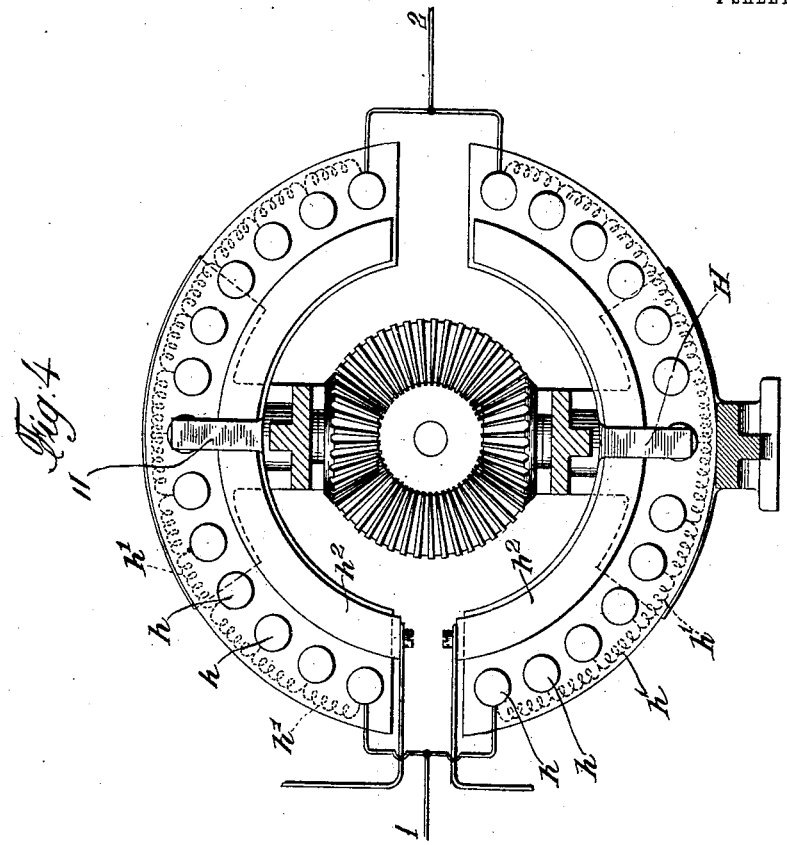
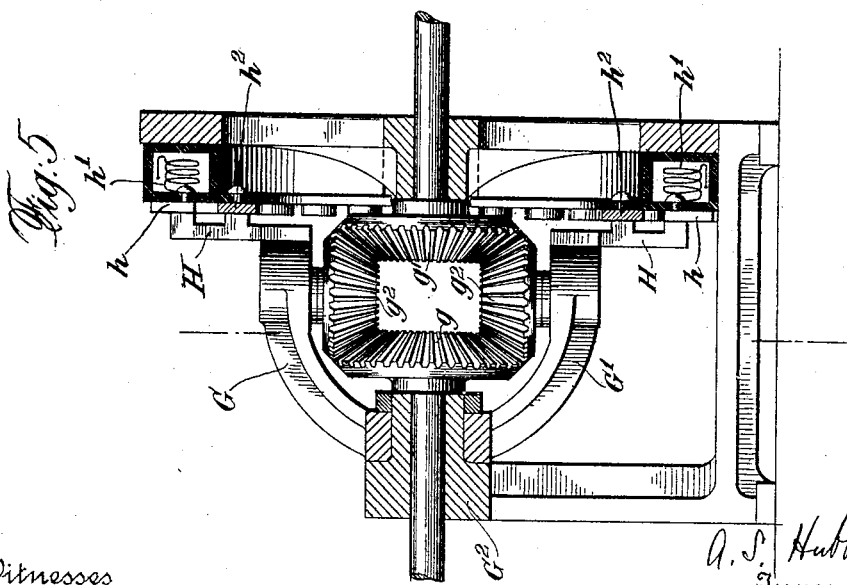
Witnesses
Geo. M. Harris.
John O. Gempler.
A. S. Hubbard
Inventor
By his Attorneys
Kenyon & Kenyon

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

972,536.  Specification of Letters Patent.  Patented Oct. 11, 1910.

Application filed June 8, 1906. Serial No. 320,699.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution in which a regulating battery is employed to steady the load of the main generator or the voltage of the system, and it is the object of my invention to automatically regulate the battery charge and discharge by simple, cheap and efficient apparatus that will constantly act to maintain the desired load on the generator or voltage across the system, being instantly acted upon by any change of load or voltage to cause the battery to instantly restore the desired condition. To this end I regulate the battery current preferably through the medium of a booster in series therewith by a pair of constantly rotating motors which are so designed and connected that at the normal load or voltage the speed of the two motors is equal or at least their speeds are such as to be without effect upon the regulating apparatus, whereas when any change of voltage or of generator load occurs, then the speed of the motors becomes unequal or at least their speeds are such as to act upon the regulating apparatus to so regulate the booster as to restore the normal condition. By my invention the regulating apparatus is quiescent whenever the desired condition is present, but is constantly acting whenever the desired condition is not present and until it is again present. Preferably I mechanically connect the two motors to the end members of a differential gear and rotate the two motors in opposite directions so that when their speed is equal the planetary member of the gear will not move, whereas when their speeds are unequal the planetary member of the gear will move in the direction of the gear connected to the motor having the higher speed. This planetary member is connected to the regulating apparatus so that its movement governs the flow of current through the booster field winding, if no exciter is employed, and the regulating apparatus I have shown and which I prefer, is a reversing rheostat, the movable arm of which is connected to the planetary member of the differential gear. In order to obtain the greatest possible sensitiveness of the apparatus and to perform the desired regulation with relatively small motors, I so arrange the motors that a given change in the load or voltage of the system will act oppositely upon the speed of the two motors, whereby each assists in moving the planetary member of the gear in the proper direction to obtain the desired regulation.

Referring to the drawings, Figure 1 illustrates one embodiment of my invention in which the speed of each motor is directly regulated by variations of the current strength of the main generator. Fig. 2 only differs in showing a slightly different arrangement of the motor field windings. Fig. 3 is another embodiment of my invention wherein the control of the motors is attained entirely by voltage variations of the system. Figs. 4 and 5 are each views of the differential gear and rheostat.

A in each case is the main generator which is indicated as a shunt dynamo, although this is immaterial to my invention. This generator A is simply typical of any source of direct current supply.

B is the battery and C the armature of a booster in series therewith. This armature is driven by the motor D preferably run at constant speed. The battery current is regulated by varying the direction and value of the electro-motive force produced by the booster armature C and this is effected by the variation of current in the field winding C' of the booster. This field winding is regulated by the changes of speed of the armatures E and F of the two motors. These motors may be very small as they have no work to perform except the moving of the arm of the rheostat.

G is a differential gear whose beveled gear $g$ is connected to and revolves with the shaft of the motor armature E.

$g'$ is the gear which is driven by the shaft of the motor F.

$g^2$, $g^2$ are the planetary gears which are mounted to freely rotate in the arms G' which in turn rotate about the axis of the armature shafts on the journal $G^2$.

Whenever the two motors rotate at equal speeds the gear $g^2$ will simply rotate around their individual axes, their being no tendency for the arms G' to move in either direction. When, however, the motors rotate at different speeds, the arms G' will necessarily be rotated in the direction of rotation of the motor having the greater speed and will continue to move in this direction until the motors once more have equal speeds.

Connected to the arms G' are the contacts H which bear upon the rheostat at diametrically opposite points thereon. $h$ are a series of contacts connected to the resistances $h'$. The adjacent ends of the two sets of resistances are connected together, as indicated, at 1 and 2, Fig. 4, and these ends are connected across the generator circuit, as shown at 3 and 4, Fig. 1.

$h^2$ are contact rings connected respectively to opposite sides of the booster field winding. The contacts H each serve to connect its contact ring with an adjacent resistance contact $h$.

When the device is in the center position shown in Fig. 4 there will be no current in the booster field because each terminal of the booster field will be connected to corresponding points in the resistances $h'$ and, therefore, to points of equal potential. When, however, the planetary member moves in one direction carrying with it the contacts H, then current will flow through the booster field in one direction and to an amount dependent upon the extent of movement of the contacts H. The movement in the other direction from the central position will send the current through the booster field in the opposite direction.

Referring more specifically to Fig. 1 each of the two motors has a field coil connected to receive substantially constant current, these field coils being indicated as $e$ and $f$. $e'$ and $f'$ are additional field windings for E and F, both being in the generator circuit so that their energizing power will vary as the generator current varies. These variations in coils $e'$ and $f'$ affect their respective motors oppositely. Thus in the present instance, the coils $e$ and $e'$ are wound cumulatively so that an increase of current in $e'$ increases the field strength of the motor, whereas coils $f$ and $f'$ are wound differentially so that an increase of current in coil $f'$ will decrease the field strength of the motor F.

From the foregoing description the operation of the system will be clear. When the various parts are adjusted by any suitable means so that the desired average load is upon the generator A, the speed of the two motors will be the same and the regulating devices will be quiescent. This will be the condition regardless of the load on the working circuit or the condition of the battery, so that at any instant at which the regulating apparatus is quiescent, the booster may be giving no voltage, or it may be producing any voltage below its maximum in either direction. The moment that, by reason of change of battery condition, or by reason of change of current in the working circuit, the generator tends to take a greater load the motor speeds will at once become different and the regulating apparatus will quickly adjust the system to meet the needed conditions and restore the original load and only the original load to the generator. In practice with such an apparatus, the arm of the rheostat, which moves freely in accordance with the movement of the planetary member of the gear, will be constantly shifting back and forth to meet the required conditions and, therefore, the quiescent condition of the regulating device is not one that will ordinarily be maintained, changes of the working circuit and of the battery condition being almost continuous.

In Fig. 2 I have omitted the coil $e$, but the general operation is the same for the proper value of current on the main generator. The speed of E will be the same as the speed of F, the speed of the latter being determined by the strength of coil $f$ minus the coil $f'$. As before any variations of current in the coils $e'$ and $f'$ will oppositely affect the speeds of their respective motors and so make a wide difference of speed between them that will cause the regulating device to be operated with great sensitiveness. In Fig. 2 I have also shown one end of the resistance of the rheostat connected between the booster and the battery instead of across the entire circuit. The operation is not, however, affected by this change.

Irrespective of the particular details of the apparatus of Figs. 1 and 2, the arrangements there illustrated embody an important feature of invention, namely, a control directly by current changes of the main generator (as distinguished from voltage or load changes) comprising apparatus for continuously changing the current in the booster field whenever the generator current is not at its predetermined value, the regulating coils in the generator circuit acting upon the movable member of the apparatus to continuously move it in the proper direction to vary the battery current except when the current in the regulating coils corresponds to that of the desired average for the main generator. Thus I provide a regulating battery system in which, although the regulation is by current changes of the main generator, yet no matter what the conditions of the working-circuit or the battery at any time the battery current will be continuously changed in the proper direction until the generator current has reached its predetermined value.

In Fig. 3 I have shown means for obtaining speed variations of the motors by voltage changes of the circuit. Here coils $e^2$ and $f^2$ are connected to any suitable source of constant potential as, for example, a supply battery B'. This battery may, of course, be small. $E^3$ and $F^3$ are coils connected across the circuit so that the current flowing through them will vary as the voltage of the circuit varies. The speed of the armature E will be determined by the additive effects of the coils $e^2$ and $e^3$, while the speed of the armature F will be determined by the difference of the effects of coils $f^2$ and $f^3$. This arrangement may be used either for the purpose of maintaining the load of the main generator at a constant value as was the case with Figs. 1 and 2, or it may be used at a distance from the main generator to maintain the voltage on the line steady in case there is a substantial variation of voltage between the generator and the point at which the battery, booster and regulating apparatus are located. In the former case it is assumed that the main generator has a distinctly rising or a distinctly falling characteristic so that changes of its load will also produce changes of voltage to affect the speed of the motors. By maintaining the voltage at a constant point the generator is also maintained with a constant current. In the latter case the steadying of the load on the main generator would become a secondary desideratum and the maintenance of the voltage at the points where the translating devices are located would be the primary desideratum.

It is not essential to my broad invention how the voltage or current changes of the system are caused to act upon the motors to vary their speeds, or is it of importance to my invention in its broader phase what the mechanical means are that are employed to regulate in accordance with the changes of the speeds of the motors, nor is it important what specific regulating device is employed to be controlled by such variations of speeds.

In the embodiment of my invention as described I have shown the gearing of the two motors arranged and connected so that the two motors rotate in opposite directions and at equal speeds when the desired average current is being given out by the main generator. This, however, is merely a matter of design and construction, it being understood that the respective speeds and directions of the two motors when the rheostat is at the position of equilibrium will depend upon the specific character of the gearing and the members to which the motors are connected.

Having thus described my invention what I claim as new and desire to protect by Letters Patent is:

1. In an electrical system of distribution, a main generator, a regulating battery in operative relation thereto, regulating means for varying the current thereof, a movable member controlling said regulating means, a pair of constantly rotating motors one having two field windings acting cumulatively and the other having two field windings acting differentially, and mechanical connections between said motors and the movable arm, actuating the latter when the motors speeds differ.

2. In an electrical system of distribution, a main generator, a regulating battery in operative relation thereto, a booster in the battery circuit, a reversing rheostat in the field circuit of said booster, a differential gearing connected through its planetary member to the rheostat, two constantly rotating motors, each having two field windings which act cumulatively on one motor and differentially on the other, and a mechanical connection between each motor and one of the members of the gearing.

3. In an electrical system of distribution, a main generator, a regulating battery in operative relation thereto, a booster in the battery circuit, a reversing rheostat in the field circuit of said booster, a differential gearing connected through its planetary member to the rheostat, two constantly rotating motors, each having two field windings one having substantially constant strength and the other having a strength varying with the electrical condition of the system, said varying strengths oppositely affecting the respective motors, and a mechanical connection between each motor and one of the members of the gearing.

4. In an electrical system of distribution, a main generator, a regulating battery in operative relation thereto, regulating means for varying the current thereof, a movable member controlling said regulating means, a pair of constantly rotating motors, each having two field windings one of which is connected to receive fluctuations of current of the main generator, said fluctuations oppositely affecting the speed of the respective motors, and mechanical connections between the motors and said movable member, actuating the same whenever the motor speeds vary from that corresponding to a predetermined generator current and restoring said predetermined current.

5. In an electrical system of distribution, a main generator, a regulating battery in operative relation thereto, regulating means for varying the current thereof, a movable member controlling said regulating means, a pair of constantly rotating motors each having two field windings one only of which is connected to receive fluctuations of current of the main generator and thereby vary the speed of each motor, and means for causing variations of speed from those corresponding to the desired average current on the main generator to actuate said movable member.

6. The combination of a rheostatic device, a movable member controlling the same, a pair of rotating motors one having two field windings acting cumulatively and the other having two field windings acting differentially, and mechanical connections between said motors and the movable member, actuating the latter when the motor speeds differ.

7. The combination of a rheostatic device, a differential gearing connected through its planetary member to the rheostat, two rotating motors, each having two field windings which act cumulatively on one motor and differentially on the other and a mechanical connection between each motor and one of the members of the gearing.

8. The combination of a rheostat, a differential gearing connected through its planetary member to the rheostat, two rotating motors, each having two field windings, one of which has a substantially constant strength and the other has a varying strength, said varying strength oppositely affecting the respective motors, and a mechanical connection between each motor and one of the members of the gearing.

9. The combination of a rheostatic device, a movable member controlling said device, two rotating motors, one having two field windings one of which windings produces a substantially constant magneto-motive force while the other winding is arranged to produce a variable magneto-motive force, and mechanical connections between said motors and said member for actuating the latter.

In testimony whereof, I have signed my name to this specification, in the presence of two subscribing witnesses.

ALBERT S. HUBBARD.

Witnesses:
EDWIN SEGER,
ANNA DALY.